ial*United States Patent Office*

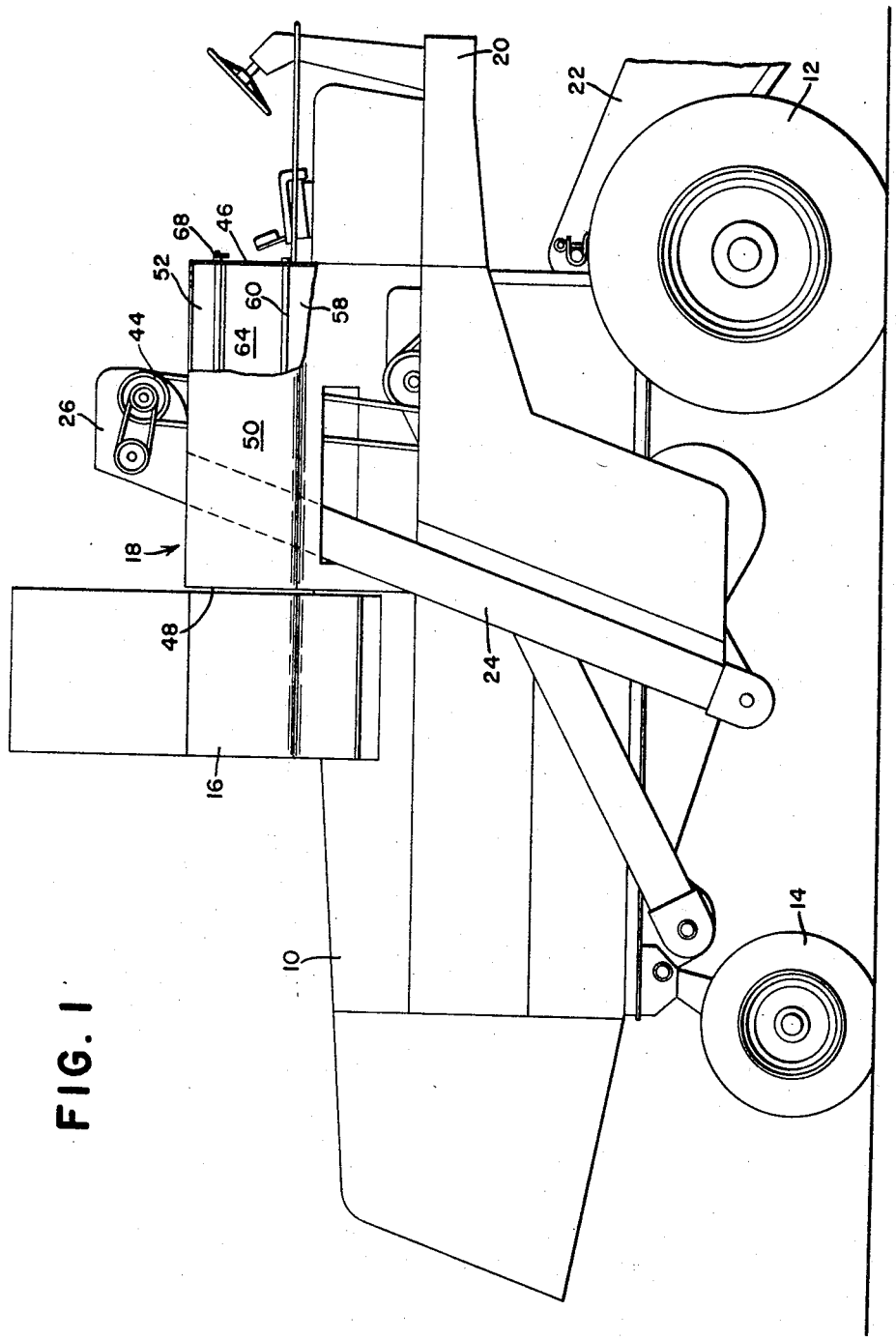

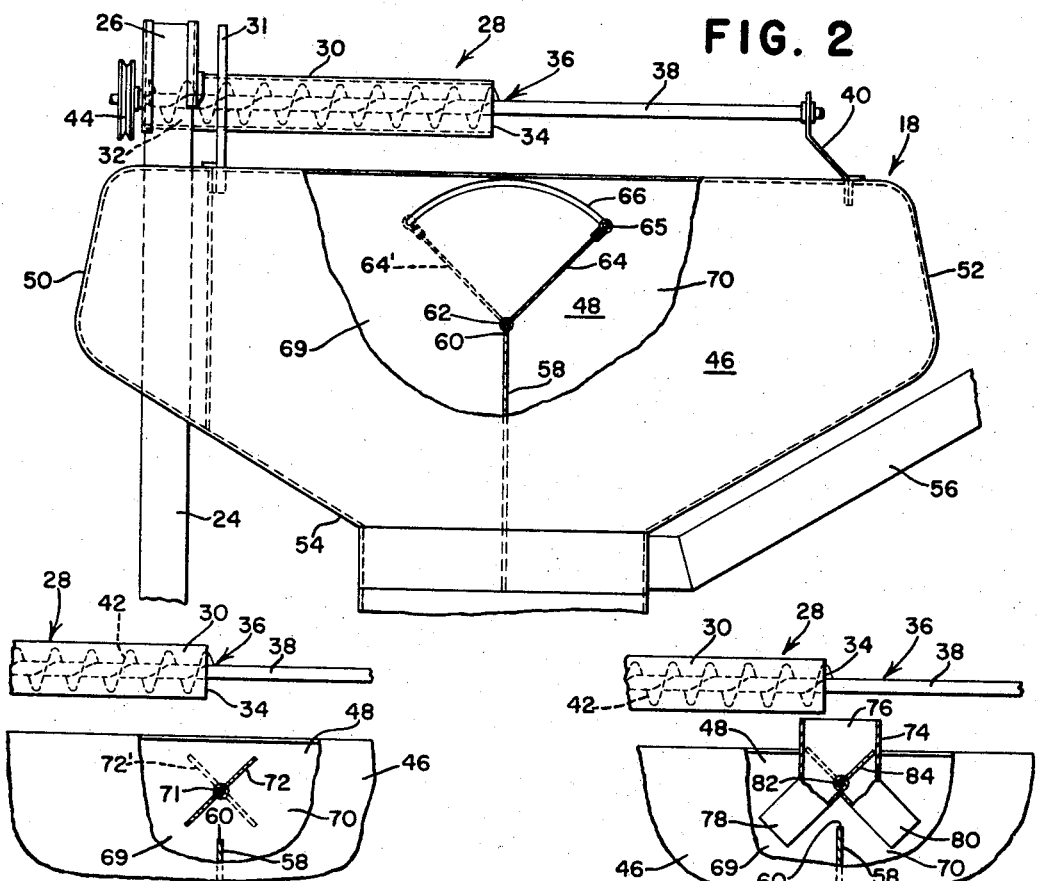
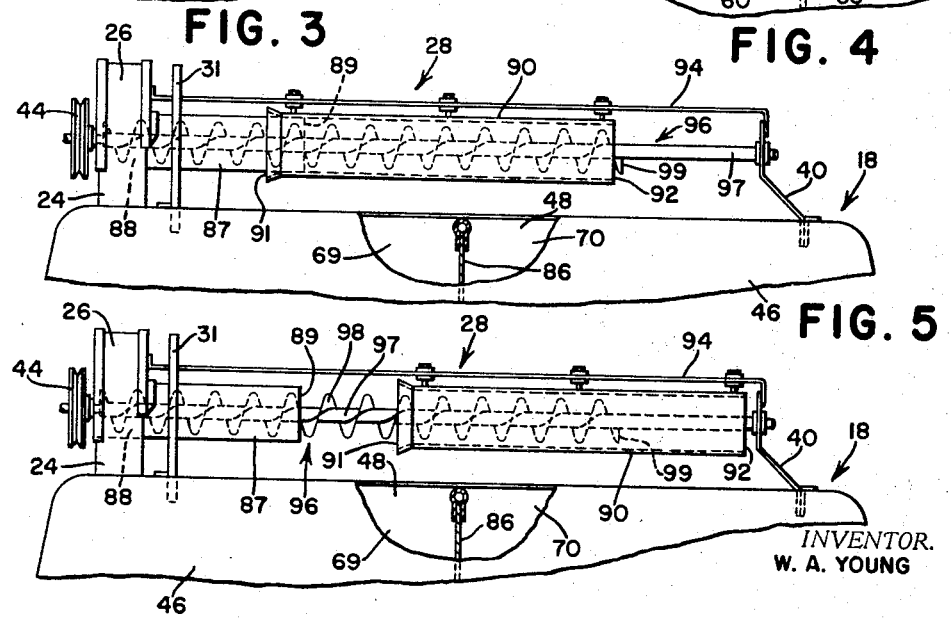

3,365,086
Patented Jan. 23, 1968

3,365,086
MATERIAL HANDLING APPARATUS
William A. Young, East Moline, Ill., assignor to Deere & Company, Moline, Ill., a corporation of Delaware
Filed Sept. 3, 1965, Ser. No. 484,798
5 Claims. (Cl. 214—519)

ABSTRACT OF THE DISCLOSURE

A combine having a central unitary elevated grain tank divided into two laterally adjacent compartment by a fore-and-aft divider and fed by a transverse auger having its discharge end generally above the divider and means associated with the discharge end of the auger for selectively directing the grain into either compartment.

This invention relates to a material handling apparatus and more particularly to a grain tank and conveyor mechanism for an agricultural combine or the like.

A typical combine includes a header which harvests the crop and moves it rearwardly to a threshing mechanism within the combine body. The separated grain is then elevated to a grain tank and temporarily stored in the grain tank and discharged at appropriate intervals through an unloading conveyor into adjacent transport or storage means.

Since the grain tank is generally located on top of the combine body, the center of gravity of the combine raises as the grain tank is filled, decreasing the stability of the combine, especially on side hills, since the grain shifts to the downhill side of the tank.

According to the present invention, means are provided for selectively loading either side of a compartment grain tank, so that the uphill side of the tank may be loaded in sidehill operation to increase the stability of the combine.

Another object is to provide such grain tank compartments by equipping a conventional combine grain tank with a fore-and-aft divider and further to provide a deflector means above the divider for selectively directing the grain from the elevator into either compartment.

Another object is to provide a transverse conveyor for moving the grain from the elevator and discharging the grain above the deflector means.

An object of another embodiment of the invention is to provide such a conveyor in the form of auger means having its delivery end shiftable between alternate positions above the grain tank compartments.

Still another object of the invention is to provide a means for loading either side of the combine grain tank, which is of simple construction, easy to manufacture, install, operate, and maintain, and which can be provided as optional equipment on new combines or installed on combines already in the field.

These and other objects will become apparent from the following description and accompanying drawings wherein:

FIG. 1 is a fragmentary side elevation of a typical combine.

FIG. 2 is an enlarged front elevation of the combine grain tank shown partly in section.

FIG. 3 is a fragmentary front elevation of the combine, similar to FIG. 2, showing a slightly different type of deflector means.

FIG. 4 is a similar to FIG. 3, showing another type of deflector means.

FIG. 5 is a view similar to FIG. 2 and shows embodiment of the invention, positioned for grain delivery to the right grain tank compartment.

FIG. 6 is a view similar to FIG. 5 with the components positioned for grain delivery to the left compartment.

The combine shown in FIG. 1 includes a main separator body 10 mounted on front and rear wheels 12 and 14 respectively, a power source 16, a grain tank 18, and an operator's station 20. The harvesting means or header (not shown) extends forwardly from the body 10 below the operator's station 20 and removes the grain from the field, delivering it rearwardly through a feeder house 22 to a threshing and cleaning mechanism within the body 10.

The cleaned grain is moved to the grain tank 18 via an elevator type conveyor 24, having a discharge end 26 at a higher level than the top of the grain tank 18, and a transverse conveyor 28. The transverse conveyor 28 includes a tube 30, supported above the grain tank by a support member 31 and the conveyor 24 and having an inlet 32, communicating with the discharge end 26 of the conveyor 24, and an outlet 34 above the grain tank 18. An auger 36 is rotatable in the tube 30 and includes an axial shaft 38, supported at one end by the bracket 40 mounted on the grain tank and at the other end by the conveyor 24, and a helicoid flight 42. The elevator conveyor 24 and the transverse conveyor 28 are both driven by a drive means 44 connected to the power source 16.

The grain tank 18 has opposite, upright front and rear walls 46 and 48 respectively, opposite, fore-and-aft side walls 50 and 52, and an inwardly and downwardly converging bottom 54, the top of the grain tank being substantially open. A discharge auger 56 is mounted on the grain tank bottom and extends outwardly from the grain tank for intermittent delivery of the grain from the grain tank to an adjacent transport or storage facility.

A generally fore-and-aft upright divider 58 rises from the bottom 54 between the front and rear walls 46 and 48 and has an upper edge 60 over which a fore-and-aft pivot 62 is mounted. This divider is substantially in the fore-and-aft median plane of the machine. A flat, fore-and-aft deflector member 64 has its lower edges attached to the pivot 60 and its upper edge attached to a fore-and-aft rod-like member 65, forward and rear ends of the member 65 extending through arcuate slots 66 through the front and rear walls 46 and 48, each slot 66 forming a portion of a circle with the pivot 62 as its center. The swinging movement of the deflector member 64 about the pivot 62 is limited by the rod 65 engaging the opposite ends of the slot 66, one extreme position of the deflector member 64 being shown in FIG. 2, the alternate extreme position being shown in FIG. 2 in dotted lines indicated by the numeral 64'. The forward end of the rod 65 extends through the slot 66 in the front wall 46 and carries a handle means 68 accessible to the operator from the operator's station.

The divider 58 and deflector 64 are approximately centrally located within the grain tank 18 and separate the grain tank into right and left compartments 69 and 70 respectively. The outlet end 34 of the transverse conveyor 28 is directly above the plane of the divider 58, and, when the deflector member 64 is in the position shown in solid lines in FIG. 2, the grain from the outlet 34 drops onto the deflector member 64 and moves into the right compartment 69. When the deflector member is moved to its alternate position 64', the grain is directed to the left compartment 70. Thus, by swinging the deflector member 64 by means of the handle 68, the operator can direct the grain into either grain tank compartments 69 or 70, so that the uphill compartment of the grain tank may be filled to increase the lateral stability of the combine.

The embodiment of FIG. 3 is similar to that of FIG. 2 except that a fore-and-aft pivot 71 extends between the front and rear walls 46 and 48 a short distance above the upper edge 69 of the divider 58. A generally flat, elongated, fore-and-aft member 72 swings on a pivot 71 and is positionable by control means (not shown) connected to the pivot 71 and actuated by the operator, the member 72 being movable between the position shown in full lines in FIG. 3, wherein it deflects the grain into the right compartment 69, and an alternate position, shown in dotted lines in FIG. 3 and indicated by the numeral 72', wherein it deflects the grain into the left compartment 70.

In the embodiment of FIG. 4, a spout 74 is mounted above the divider 58 and includes an upwardly disposed inlet 76 below the outlet 34, a first outlet 78 above the compartment 69 and a second outlet 80 above the compartment 70. The spout 74 supports a fore-and-aft pivot 82, and a deflector member 84 is swingable on the pivot 82 within the spout 74 between alternate positions wherein it covers the alternate outlets 78 and 80, directing the grain which moves through the inlet 76 through the uncovered outlet 78 or 80. The position of the deflector member 84 is established by control means (not shown) actuated by the operator.

A slightly different embodiment is shown in FIGS. 5 and 6, the grain tank 18 again including a fore-and-aft divider 86, extending between the front and rear walls 46 and 48 and to the top of the tank 18 and again separating the tank into right and left compartments 69 and 70. A first transverse conveyor tube 87 is supported on the support member 31 above the tank and has an inlet 88, communicating with the outlet or discharge end of the elevator 24, and an outlet 89 above the right compartment 69. A second conveyor tube 90, having an inlet 91 and an outlet 92, is supported on a transverse track 94 for axial, transverse, sliding movement between one position, shown in FIG. 5, in which its inlet end 91 overlaps the outlet 89 of the first tube 86 and its outlet 92 is above the left grain tank compartment 70, and a second position, shown in FIG. 6, wherein there is a substantial space between the first tube outlet 89 and the second tube inlet 91. A transverse auger 96 is coaxially rotatable within the conveyor tubes 86 and 90 and includes a shaft 97, journaled at one end in the support bracket 40 and at the other end in the elevator 24, and a helical flight 98, having a terminal end 99 at the outlet 92 of the tube 90 when the tube 90 is positioned for delivery of the grain to the compartment 70, as shown in FIG. 5, the auger 96 moving the grain through the telescoping tubes 86 and 90, whereby the grain drops into the grain tank compartment 70. When the second tube 90 is shifted to the position shown in FIG. 6, the grain drops out of the outlet 89 of the first tube 86 into the grain tank compartment 69. The alternate positions of the second tube 90 on the track 94 may be established by an conventional control means (not shown) such as a lever arrangement actuated by the operator.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a combine or the like having a main body adapted to advance over a field and crop treating means within the body, the combination therewith of a single elevated container mounted on the body, a generally fore-and-aft divider having a generally fore-and-aft upper edge and mounted within the container for separating the container into laterally adjacent compartments, a conveyor means on the body for moving the crops from the treating means to the container and including an elevator along one side of the container and a transverse one-way auger above the container, fed by the elevator, and having a discharge end generally above the divider, and a deflector means associated with said discharge end and including a generally fore-and-aft pivot above the divider and below the discharge end of the conveyor and a deflector member swingably mounted on said pivot for movement between alternate positions wherein it directs the crop moving from said discharge end into said alternate compartments.

2. The invention defined in claim 1 wherein the deflector means also includes a spout having an inlet opening below the conveyor discharge end and alternate outlet openings above the alternate container compartments and the deflector member is swingable within the spout between its alternate positions wherein it covers one outlet opening in one position and the other outlet opening in the other position.

3. The invention defined in claim 1 wherein the container includes transverse, opposite, front and rear walls, the divider extending between said walls, the upper edge of said divider forming said pivot, the deflector member being an elongated, fore-and-aft, relatively flat member extending between said front and rear walls and swingable about its lower edge on said pivot, said deflector means also including stop means mounted on said container and operably engaging said deflector member to establish said alternate deflector member positions.

4. In a combine or the like having a main, fore-and-aft body, adapted to advance over a field, and crop harvesting and treating means mounted thereon, the combination therewith of a crop receptacle comprising: a single elevated open-top container mounted substantially centrally above said body and including a bottom, opposite fore-and-aft side walls and transverse front and rear walls; a generally fore-and-aft divider between said front and rear walls and forming a pair of laterally adjacent compartments within said container; a conveyor means operably mounted on the body for moving the crop from the treating means to the container and including a generally upright elevator adjacent to one of the sides and a transverse one-way auger fed by the elevator above the container and having a discharge end overlying the divider; a fore-and-aft pivot mounted above the divider within the container below said discharge end; and a deflector member rockably mounted on said pivot for swinging between a first position below said discharge end wherein it deflects the crop moving from the discharge end into one compartment and a second position wherein it deflects the crop into the other compartment.

5. In a combine or the like having a main body adapted to advance over a field and crop harvesting and treating means mounted thereon, the combination therewith of a crop receptacle comprising: an elevated container mounted on said body and open toward the top; a generally fore-and-aft divider mounted within the container and separating the container into first and second laterally adjacent compartments; an elevator type conveyor having a discharge end operably mounted on the body for elevating crops from the treating means to a point above the container; a first transverse tube having an inlet communicating with the discharge end of the elevator conveyor and an outlet above the first container compartment; a second transverse tube having an inlet and an outlet and mounted above the container coaxially with said first tube and axially shiftable between a first position wherein its inlet end is axially spaced from the outlet of said first tube and a second position wherein its inlet communicates with the outlet of said first tube and its outlet is above said second container compartment; and a transverse auger coaxially rotatable in said tubes for moving the crop from the discharge end of the elevator conveyor through the outlet of the first tube in the first position of the second tube and through the outlet end of the second tube in the second position of the second tube.

(References on following page)

References Cited

UNITED STATES PATENTS

| | | | |
|---|---|---|---|
| 483,909 | 10/1892 | Droste et al. | 193—31 |
| 2,356,096 | 8/1944 | Shallock | 193—31 |
| 2,842,242 | 7/1958 | Patterson | 198—68 |
| 3,018,874 | 1/1962 | Bunnell | 214—17 X |
| 3,213,601 | 10/1965 | Hill | 56—473.5 |

FOREIGN PATENTS

| | | |
|---|---|---|
| 311,827 | 5/1919 | Germany. |
| 695,833 | 9/1940 | Germany. |

GERALD M. FORLENZA, *Primary Examiner.*

ALBERT J. MAKAY, *Examiner.*